Figure 4:
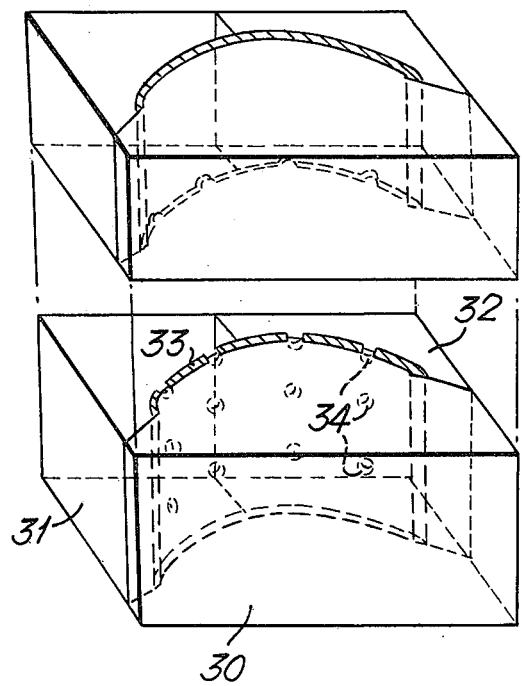

United States Patent [19]

Wilkinson et al.

[11] 4,321,010
[45] Mar. 23, 1982

[54] AEROFOIL MEMBER FOR A GAS TURBINE ENGINE

[75] Inventors: Wilfred H. Wilkinson, Turnditch; Edwin Pateman, Allestree; Anthony G. Gale, Wollaton; John Slinger, Spondon, all of England

[73] Assignee: Rolls-Royce Limited, London, England

[21] Appl. No.: 62,419

[22] Filed: Jul. 31, 1979

[30] Foreign Application Priority Data

Aug. 17, 1978 [GB] United Kingdom ................ 33660/78

[51] Int. Cl.³ ............................................... F01D 5/18
[52] U.S. Cl. ..................................... 416/92; 416/96 A
[58] Field of Search ..................... 416/96 A, 92, 90 R, 416/97 R; 415/115

[56] References Cited

U.S. PATENT DOCUMENTS

| | | | |
|---|---|---|---|
| 3,056,014 | 9/1962 | Hulley et al. ................ | 416/96 A X |
| 3,094,310 | 6/1963 | Bowmer ................. | 416/92 |
| 3,697,192 | 10/1972 | Hayes ...................... | 416/96 |
| 3,742,706 | 7/1973 | Klompas ............. | 416/97 R |
| 3,867,068 | 2/1975 | Corsmeier et al. ........... | 416/96 A X |
| 3,902,820 | 9/1975 | Amos ................. | 416/97 R |

FOREIGN PATENT DOCUMENTS

| | | | |
|---|---|---|---|
| 195187 | 1/1958 | Austria ............................ | 416/96 R |
| 949459 | 8/1949 | France ................................. | 416/92 |

Primary Examiner—Everette A. Powell, Jr.
Attorney, Agent, or Firm—Cushman, Darby & Cushman

[57] ABSTRACT

A blade or vane structure for a gas turbine engine comprises a hollow aerofoil member and a cooling air entry tube within the hollow aerofoil member, the aerofoil member and the tube comprising a unitary cast structure. To make this structure it is proposed that a lost wax casting process should be utilized, with the internal cavities formed using ceramic cores formed with the aid of temporary, disposable pieces which define the space eventually occupied by the tube.

5 Claims, 13 Drawing Figures

U.S. Patent  Mar. 23, 1982  Sheet 1 of 6  4,321,010
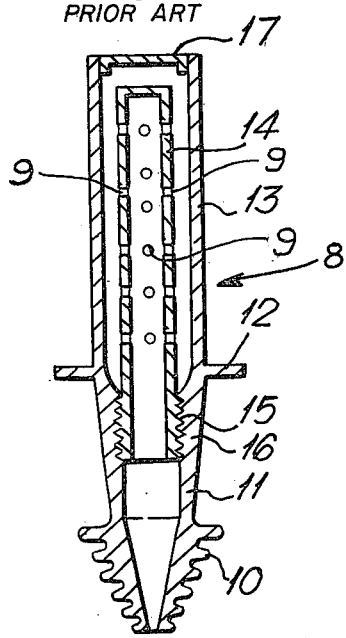
Fig. 1.
PRIOR ART
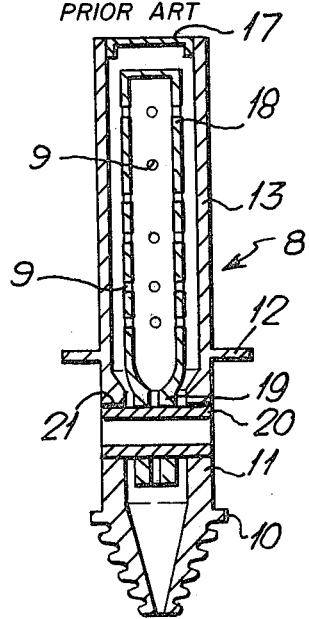
Fig. 2.
PRIOR ART
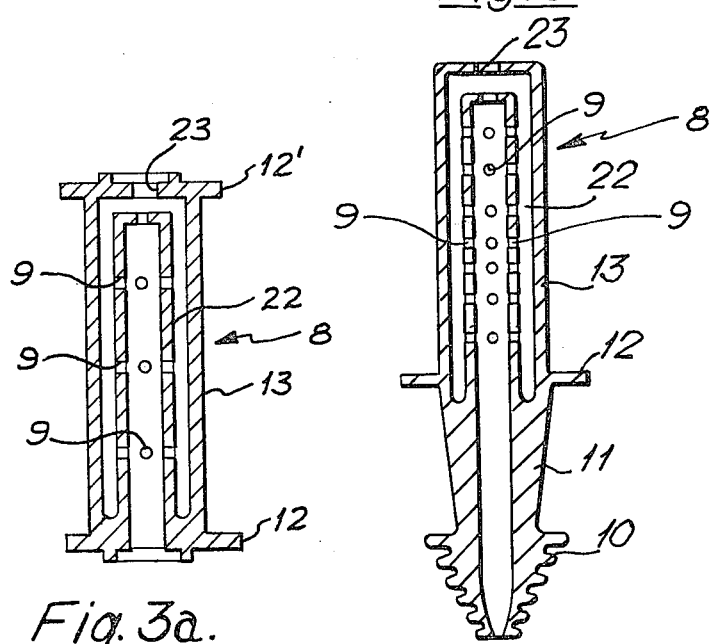
Fig. 3.
Fig. 3a.

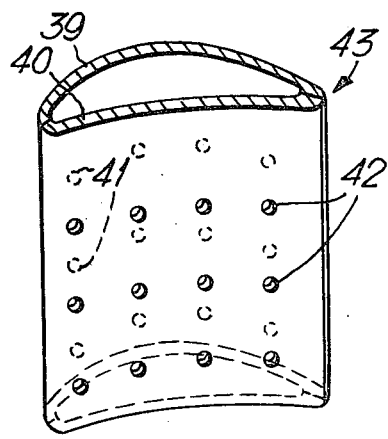
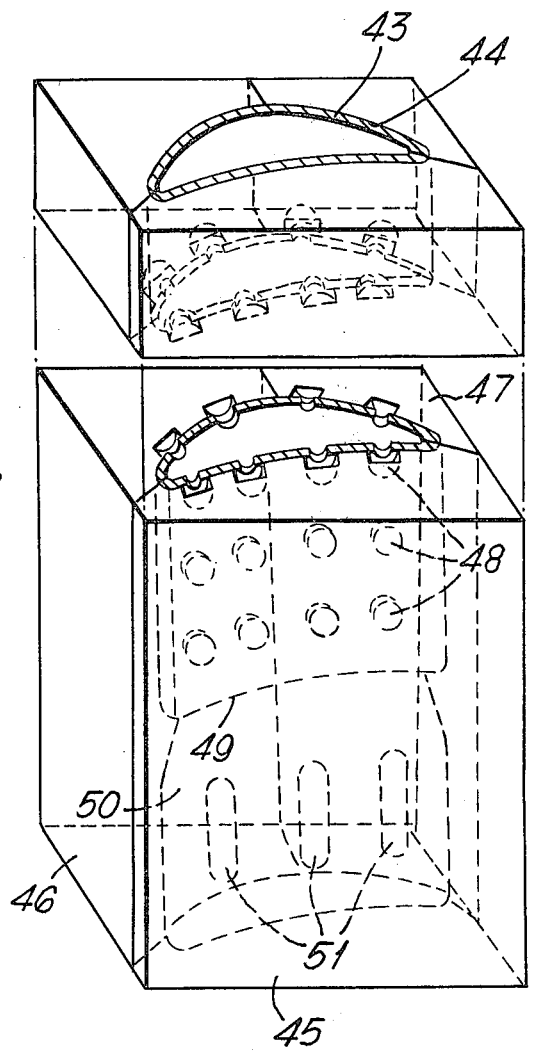

AEROFOIL MEMBER FOR A GAS TURBINE ENGINE

This invention relates to a blade or vane structure for a gas turbine engine and a method of making the blade or vane structure.

The hollow aerofoil members such as blades or vanes for gas turbine engines frequently require to be cooled, normally by the supply of cooling air or other gas to their hollow interior. One particularly widely used method of cooling involves the use of a separate impingement tube mounted within the hollow interior of the aerofoil. Cooling air is fed inside this tube and passes through a plurality of small apertures in the tube to impinge on the inner wall of the aerofoil in the form of a plurality of jets.

This is an effective way of cooling the aerofoil member but it involves the complication of providing the cooling air entry tube inside the aerofoil member. In the past this tube has been made as a separate fabrication which has then been introduced into the hollow aerofoil member from the tip or from the root of the blade or vane structure. This means that only tubes may be used which are capable of passing through the apertures at the root or tip, that some form of retention for the tube must be provided and that additional expense is involved in the manufacture of the blade or vane structure.

The present invention provides a blade or vane structure having a hollow aerofoil member and a method of making it in which it is not necessary to introduce a separate fabricated cooling air entry tube into the hollow aerofoil member.

According to the present invention a blade or vane structure for a gas turbine engine comprises a hollow aerofoil member and a cooling air entry tube within the hollow aerofoil member, the aerofoil member and tube comprising a unitary cast blade or vane structure.

In the case of a blade the blade may also comprise a shank portion and a root portion which comprise parts of the unitary cast structure, while in the case of a vane the vane may also comprise inner and outer platform portions which comprise part of the unitary cast structure.

The invention also includes a method of making a blade or vane structure for a gas turbine engine comprising casting as a unitary structure, a hollow aerofoil member and a cooling air entry tube within the hollow aerofoil member. In the case of a blade structure, the casting process may also produce the root and shank portions, while in the case of a vane, which is sometimes referred to as a blade, the casting process may also produce the inner and outer platform portions.

The casting is preferably performed using a lost wax process.

A ceramic core is preferably used to define the internal cavities in the aerofoil.

The core may be made using a disposable piece to define the volume which forms the tube. The disposable piece may be made using a fabrication technique.

The invention will now be particularly described merely by way of example with reference to the accompanying drawings in which:

FIGS. 1 and 2 are longitudinal cross sections through blades of the prior art,

FIG. 3 is a view similar to FIGS. 1 and 2 but of a blade in accordance with the present invention, FIG. 3a is a view similar to FIG. 3 but showing a stator or nozzle guide vane or blade made in accordance with the present invention, FIGS. 4 to 8 illustrate consecutive steps in part of one method for the manufacture of a blade in accordance with the invention and, FIGS. 8 to 12 are similar to FIGS. 4 to 8 but illustrate a second method in accordance with the invention.

FIGS. 1 and 2 illustrate the prior art aerofoil members, in this case blades, and enable the shortcomings of these designs to be appreciated. Both Figures show in longitudinal cross section, blade or vane structures generally designated at 8 having the same basic features of a root portion 10, a shank 11, a platform 12 and a hollow aerofoil member 13. In the FIG. 1 design the hollow aerofoil member has a cooling air entry or impingement tube 14 located within its hollow exterior and retained within the aerofoil member 13 by brazing at 15. In order to provide the necessary strength for this brazing, the length of the shank 11 must be enough to allow the provision of relatively long shoulders 16 to which the tube may be attached by the braze 15.

It will be understood that in this, as in the other two designs, the blade or vane structure 8 is cooled by the flow of cooling air from the inside of the tube 14 through apertures 9 in the form of jets which impinge on the interior surface of the aerofoil 13. To allow this form of cooling, air must enter the tube 14 from its extremity adjacent the root, being fed from below the root through air entry holes.

A further noteworthy feature of the FIG. 1 design lies in the fact that the hollow aerofoil member 13 is initially formed with a large opening at its tip, to enable the tube 14 to be inserted into the hollow aerofoil member. This opening must subsequently be closed off by a brazed-in tip cap 17.

Although commonly proposed, designs like that of FIG. 1 have numerous disadvantages. Thus the necessity to insert the tube 14 through the tip of the aerofoil member 13 into its hollow interior causes considerable constraints on the degree of twist and taper and thickness of the aerofoil and in order to operate satisfactorily it is usually necessary to compromise the aerodynamic design of the aerofoil to a significant degree. So far as the mechanical design is concerned, the necessity to provide the long shoulders 16 leads to the shank 11 being longer and more massive than would be required for simply supporting the aerofoil. Again, the provision of the shoulders and similar features can provide considerable interference with the flow of air into the tube 14. Finally, there is considerable difficulty in carrying out any kind of inspection of the braze 15 which is clearly an unsatisfactory state of affairs.

An alternative prior art construction is that shown in FIG. 2. Here the impingement tube 18 is provided with thickened supporting portions 19 having holes therein through which a mounting pin 20 passes. The pin 20 engages with holes 21 in the shank 11.

Although this construction avoids the difficulty of inspection inherent in the FIG. 1 device, it has other problems. The thickened portions 19 and the pin 20 provide an even more serious blockage of the air flow into the tube 18, and they make up a very heavy construction. Exactly the same problems with aerodynamic shape etc arise as in the case of FIG. 1.

Turning now to the embodiment of FIG. 3 which is in accordance with the invention, it will be seen that the blade or vane structure generally designated at 8 together with its impingement tube 22 is cast as an integral whole. There is no need for thickened parts of the shank 11, the shank 11 is shorter and the tube does not have to be inserted into the hollow aerofoil member 13 either through the root or the tip. There is therefore, much more freedom of aerodynamic design and the weight of the blade is considerably less than that of the FIGS. 1 and 2 structures.

It will also be noted that the tip aperture 23 of the hollow aerofoil member 13 shown in the FIG. 3 embodiment is much smaller than is necessary in the prior art, only being sufficient to enable the core used in the casting process to be supported at both ends. This again produces savings in weight and improved reliability, although it may well be that in practice a larger aperture would be left to assist inspection of the interior of the blade.

FIG. 3a discloses an embodiment of the present invention wherein the blade or vane structure 8 is used as a stator vane or nozzle guide vane for a gas turbine engine. In this embodiment, the blade or vane structure 8 is provided with a hollow aerofoil member 13, not only cast integrally with the impingement tube 22 but also cast with inner and outer platforms 12 and 12' positioned respectively adjacent the inner and outer ends of the aerofoil member 13.

The remaining Figures illustrate the initial steps of a method in which a blade similar to that of FIG. 3 may be made. It will be noted that each of FIGS. 4–8 inclusive represent die assemblies used to produce the various pieces used in the method, and that in order to enable the section of the dies and contents to be seen, the dies have been illustrated as sectional with the sectioned pieces 'exploded' apart.

Figure 5:
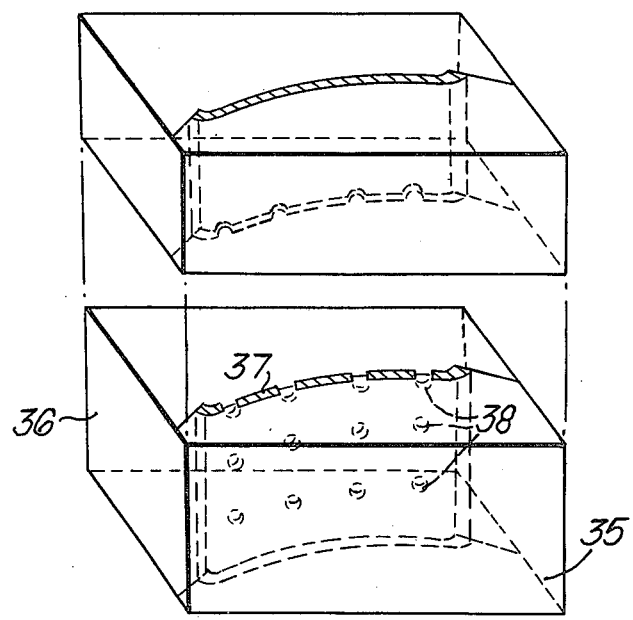

FIGS. 4 and 5 illustrate the manufacture of a composite disposable piece which is used in the production of a ceramic core for the method of the invention. In FIG. 4 there is shown in section a three part die consisting of separable parts 30, 31 and 32 which fit together to leave a central cavity 33 whose shape is approximately one half of an aerofoil section shell but having cylindrical projections 34 extending across its thickness. Similarly FIG. 5 shows a two part die made up of the pieces 35 and 36, in this case the two parts fit together to define a central cavity 37 which has cylindrical projections 38 extending across its thickness. In use the two dies are assembled together and a disposable material is injected through sprue passages (not shown) to fill the cavities 33 and 37. The disposable material is injected while in the liquid state and is subsequently allowed or caused to harden. The pieces of each of the dies are then separated so that the solid pieces having the shapes of the respective cavities may be removed from the dies.

The actual material used to produce these disposable pieces could be one of several and could for instance comprise a hard wax, a thermoplastic material or other material which may be destroyed by heating or by dissolution or by chemical means. The material must, however, be capable of being injected in liquid condition and then of being hardened to produce a body which will withstand the strains of the manufacture process.

In FIG. 6 it will be seen that the two disposable pieces 39 and 40 which have been formed in the cavities 33 and 37 respectively comprise the two flanks of an apertured composite aerofoil shaped tube. The projections 34 have produced corresponding apertures 41 in the pieces 39 while projections 38 have produced apertures 42 in piece 40. As the next step in the manufacturing process these two pieces 39 and 40 are joined together by a method which would depend upon the chemical composition of the pieces. Thus some materials may be able to be glued together while with others a heating technique may be used.

The composite disposable tube which will be given the reference numeral 43 is then held in place in the central cavity 44 of a further three part die made up of the pieces 45, 46 and 47 FIG. 7. This cavity 44 has an upper portion whose shape generally corresponds to that of the outside of the tube 43 but which has shallow circular depressions 48 formed to coincide with the position of each of the apertures 41 and 42. At the lower extent of the tube 43 the cavity has a ledge 49 on which the tube rests, and below this ledge the cavity expands slightly to form an extension 50 which has three projections 51 extending across it and dividing it into three passages.

This die is used in the same way as that of FIG. 4 but in this case a more durable liquid ceramic material is injected through sprue passages (not shown) into the cavity 44. The actual composition of the ceramic may vary considerably but normally the material will include finely divided particles of ceramic suspended in water and with the addition of water soluble resin base. Thus the liquid material may be injected into the cavity and caused to harden by heating or in some cases by merely leaving it to cure.

It will be seen that the space filled by the ceramic will comprise the interior of the tube 43, the extension piece 50, and the apertures 41 and 42 which lead to the depressions 48. In this way the tube 43 will be bonded to the ceramic piece 52 thus formed by the ceramic extending through the apertures 41 and 42 to fill the depressions 48 to form buttons of ceramic 53.

It will be noted that during the injection process, which may require relatively high pressure injection of the ceramic, the relatively fragile tube 43 is very well supported by the die pieces, whose inner surfaces engage with the majority of the outer surface of the tubes.

Once the ceramic material has hardened the piece 52 may be removed by separating the die parts 45, 46 and 47. The piece 52 with the tube 43 still attached is then located in a third die for a second stage of ceramic injection FIG. 8. This third die is made up of three die parts, 54, 55 and 56 to form an internal cavity 57 whose lower portion has the shape of the extension 50 so that it engages closely with that part of the piece 52 formed by the extension 50. In this way the piece is located within the die although it may be desirable to provide a similar engagement at the upper end of the die.

The main part of the cavity 57 is formed in the shape of the internal cavity required in the blade to be produced. Thus it comprises a substantially aerofoil section cavity whose forward and mid portion allows a small clearance between the outer extent of the buttons 53 and the cavity wall, and whose trailing portion has opposed cylindrical pins 58 which extend from the parts 54 and 56 to meet along a parting line.

Ceramic is injected into the cavity 57 in just the same way as with the preceding ceramic injection step. In this case the ceramic will fill the cavity, and because of the projecting ceramic buttons 53 will bond effectively to the piece 52. The overall shape of the ceramic piece thus formed is roughly aerofoil, with the tube 43 embedded therein and with passages extending across its rearward portion formed by the pins 58.

Once the ceramic piece 59 thus formed has hardened it may be removed from the die by disassembling the parts 54, 55 and 56. The piece 59 as removed from the die has embedded therein the tube 43, and before using the piece in a casting process it is necessary to remove the tube 43. Since this tube is made of a diposable material it will clearly be possible to remove it using a method which will suit the particular material used. For thermoplastic or combustible materials heat will be applied, while for soluble materials a solvent technique will be used.

Figure 9:
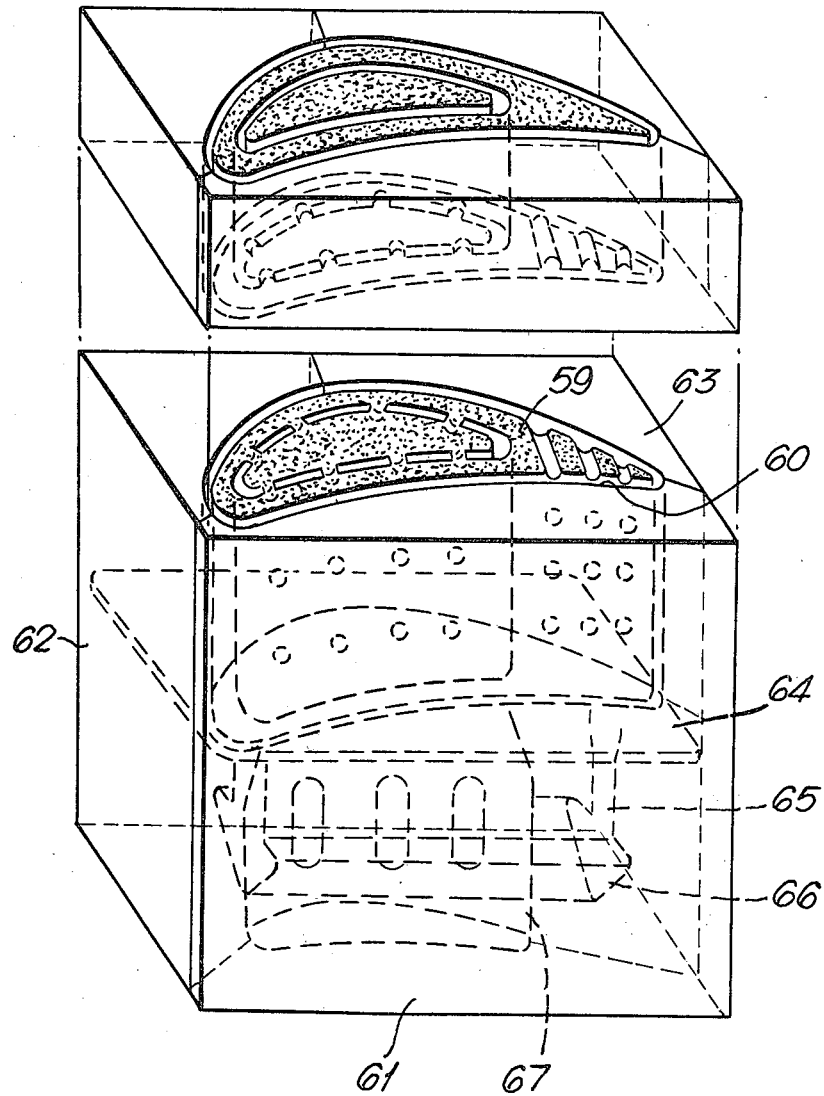

The ceramic core 59 is then used in a conventional lost wax investment casting process to make the blade. Only the first step of this process is illustrated in FIG. 9. It will be seen that the core 59 is supported inside a further cavity 60 defined by a further three piece die made of the pieces 61, 62 and 63. The shape of this cavity is arranged to be that of the external surface of the blade to be made. It will be noted that in addition to an aerofoil shaped portion closely surrounding the upper part of the core 59, the cavity 60 also has a portion 64 which defines the shape of the blade platform, a portion 65 which defines the blade shank, a portion 66 which defines a blank from which the root will be machined, and a portion 67 which grips the lower part of the extension from the core 59 to locate the cores 59 in the die. Inside this cavity molten wax is injected through sprue passages (not shown) to form a wax duplicate of the casting which is finally to be made and which has embedded therein the core 59 which will serve to define the internal cavities within the blade. In accordance with the normal lost wax technique this wax pattern is then invested with ceramic material to produce a mould and the wax is then melted out and replaced by molten metal to form the desired blade shape. It will be seen that the blade which is cast will include a hollow aerofoil whose shape is defined initially by the space between the core 59 and the surface of the cavity 60 and that it will also include an aerofoil shaped tube supported within its hollow interior and whose shape is defined by the cavities formed within the core 59 by the disposable piece 43. Thus a blade may be cast which has the impingement tube formed integrally therewith and having the advantages set out above in relation to FIG. 3.

Figure 10:
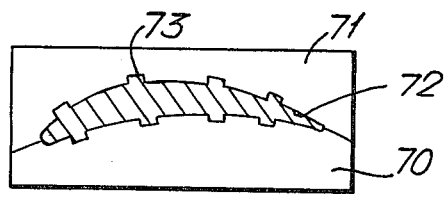
Figure 11:
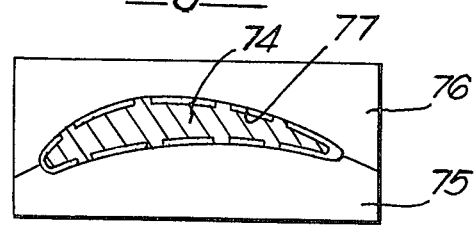
Figure 12:
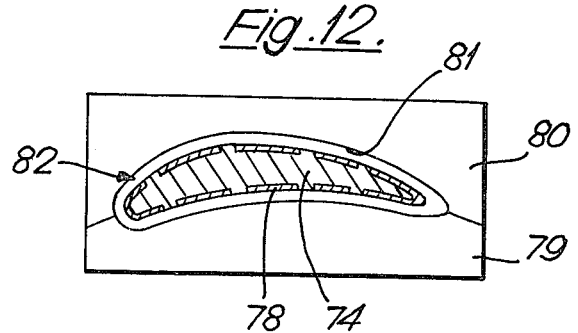

FIGS. 10 to 12 are views illustrating a different method of manufacture. It will be noted that for simplicity, these views only show a cross-section of the apparatus involved. In FIG. 10 is illustrated a two piece die which has pieces 70 and 71 which define a cavity 72 when fitted together. The cavity 72 is arranged to have the shape of the inside of the desired impingement tube, together with a portion similar to 50 and it will be noted that indentations 73 in the cavity 72 correspond to the apertures eventually required through the cooling tube walls.

Figure 8:
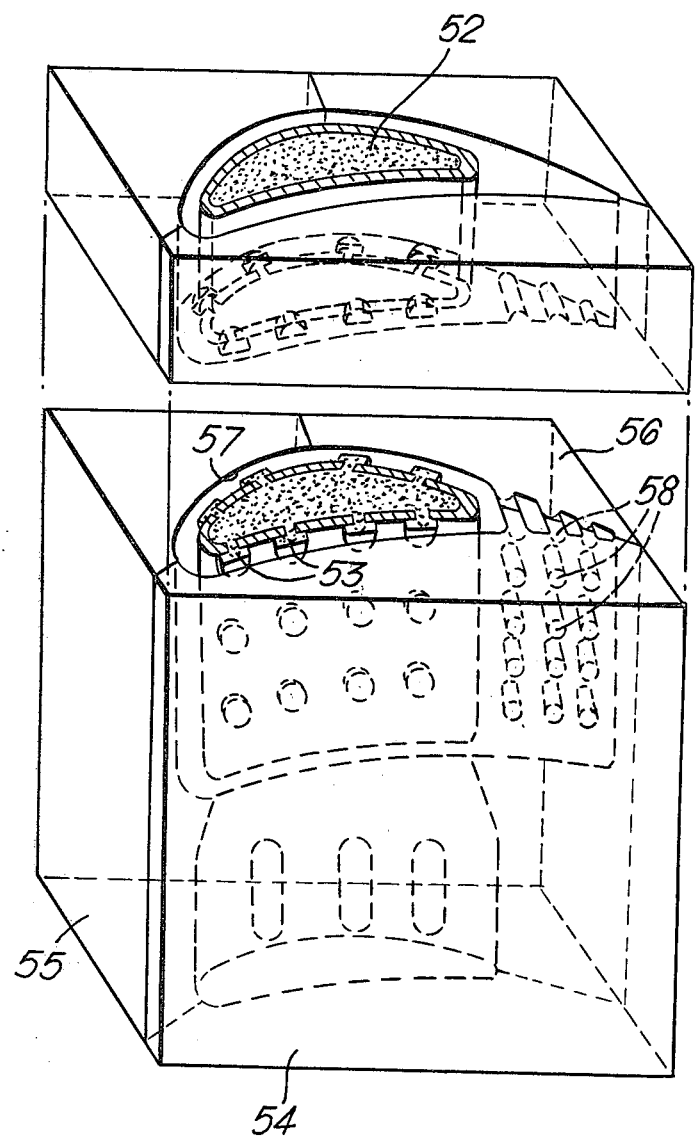

Ceramic material similar to that used in the step of FIGS. 7 and 8 is injected into the cavity 72, caused to solidify and then removed from the die. Thus a first ceramic core 74 similar to core piece 52 of FIG. 7 is produced. This core is mounted in another two piece die FIG. 11 made up of pieces 75 and 76 which define the cavity 77 whose shape is that of the external surface of the required impingement tube. It will be understood that the core 74 and the cavity 77 between them define a space whose shape is that of the cooling air tube itself.

Into this space a disposable material similar to that referred to in connection with FIGS. 4 and 5 is injected and is caused to harden. The composite core piece made up of the core 74 and the disposable insert 78 is then removed from the die parts 75 and 76 and is in turn supported in a further two part die which is composed of the parts 79 and 80 FIG. 12. Its internal cavity 81 has the shape of the hollow interior of the blade and by injecting the same ceramic material into the space between the composite core piece and the die a core 82 similar to 59 may be produced and the disposable material 78 may be removed as before.

It will be seen that this method has the advantage of employing fewer dies than the previous method but it should be noted that it may be necessary to make special provision for ensuring that the projections formed in the indentations 73 bond properly to the ceramic which is injected into the cavity 81.

It will be noted that either of the above methods is capable of producing a blade or vane structure 8 which is a unitary structure having advantages set out in relation to FIGS. 3 and 3a. However, it should be noted that there could be modification and additions to the methods described and that the detailed shapes and internal configurations of the blades could be varied. Thus in particular the blade could be provided with a tip shroud and the impingement tube could be used to cool only a minor portion of the blade rather than the majority of the cooled interior as is the case in the embodiments described.

Moreover although the present invention has been described with reference to blades which are adapted for rotation within a gas turbine engine, it may also be applied to other blade or vane structures 8 such as stator or nozzle guide vanes as shown in FIG. 3a.

We claim:

1. A unitary cast vane or blade structure for a gas turbine engine comprising:
 a hollow aerofoil member having an inner end and an outer end; and
 a cooling air entry tube having an inner end and an outer end, said cooling air entry tube having its inner end integral with the inner end of said hollow aerofoil member, said cooling air entry tube extending from the inner end toward the outer end of said hollow aerofoil member in cantilever relationship within and spaced entirely from an interior surface of said hollow aerofoil member whereby said unitary cast structure of said hollow aerofoil member and said cooling air entry tube has a reduced overall weight and said aerofoil member is provided with increased freedom of aerodynamic design.

2. A unitary cast vane or blade structure as claimed in claim 1 in which said cooling air entry tube is provided with at least one aperture and wherein the outer end of said cooling air entry tube is integrally closed.

3. A unitary cast vane or blade structure as claimed in claims 1 or 2 in which said aerofoil member has an integral closed outer end with an aperture therethrough smaller in dimension than a cross-section of said cooling air entry tube.

4. A unitary vane or blade structure as claimed in claim 1 in which said structure includes a root portion and a shank portion integral with the inner end of said hollow aerofoil member.

5. A unitary cast vane or blade structure as claimed in claim 1 in which said structure is provided with a platform member adjacent each of the inner and outer ends of said hollow aerofoil member, each said platform member being integral with said hollow aerofoil member.

* * * * *